United States Patent
Gambetta et al.

(10) Patent No.: US 10,977,546 B2
(45) Date of Patent: Apr. 13, 2021

(54) SHORT DEPTH CIRCUITS AS QUANTUM CLASSIFIERS

(71) Applicant: International Business Machines Corporation, Armonk, NY (US)

(72) Inventors: Jay M. Gambetta, Yorktown Heights, NY (US); Vojtech Havlicek, Ceska Kamenice (CZ); Paul Kristan Temme, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 806 days.

(21) Appl. No.: 15/826,327

(22) Filed: Nov. 29, 2017

(65) Prior Publication Data

US 2019/0164034 A1    May 30, 2019

(51) Int. Cl.
*G06N 99/00*    (2019.01)
*G06N 3/04*    (2006.01)
(Continued)

(52) U.S. Cl.
CPC ............. *G06N 3/04* (2013.01); *G06N 3/0472* (2013.01); *G06N 3/0481* (2013.01); *G06N 3/08* (2013.01);
(Continued)

(58) Field of Classification Search
CPC ........ G06N 3/04; G06N 10/00; G06N 3/0472; G06N 3/0481; G06N 3/08
(Continued)

(56) References Cited

U.S. PATENT DOCUMENTS

| 9,727,824 B2 | 8/2017 | Rose et al. |
| 2008/0140749 A1 | 6/2008 | Amato et al. |

(Continued)

FOREIGN PATENT DOCUMENTS

| WO | 2016/154460 | 9/2016 |
| WO | 2017031356 A1 | 2/2017 |
| WO | 2017066695 A1 | 4/2017 |

OTHER PUBLICATIONS

Schuld et al., "Implementing a distance-based classier with a quantum interference circuit," arXiv:1703.10793v2 [quant-ph], Aug. 28, 2017, 10 pages.
(Continued)

*Primary Examiner* — Ly D Pham
(74) *Attorney, Agent, or Firm* — Amin, Turocy & Watson, LLP

(57) ABSTRACT

Techniques using short depth circuits as quantum classifiers are described. In one embodiment, a system is provided that comprises: quantum hardware, a memory that stores computer-executable components and a processor that executes computer-executable components stored in the memory. In one implementation, the computer-executable components comprise a calibration component that calibrates quantum hardware to generate a short depth quantum circuit. The computer-executable components further comprise a cost function component that determines a cost function for the short depth quantum circuit based on an initial value for a parameter of a machine-learning classifier. The computer-executable components further comprise a training component that modifies the initial value for the parameter during training to a second value for the parameter based on the cost function for the short depth quantum circuit.

20 Claims, 12 Drawing Sheets

(51) Int. Cl.
   *G06N 3/08*    (2006.01)
   *G06F 15/80*   (2006.01)
   *G06F 9/30*    (2018.01)
   *G06N 10/00*   (2019.01)
   *G06N 20/00*   (2019.01)

(52) U.S. Cl.
   CPC .......... *G06N 10/00* (2019.01); *G06F 9/3001* (2013.01); *G06F 15/80* (2013.01); *G06N 20/00* (2019.01)

(58) Field of Classification Search
   USPC ............................................. 706/27, 25, 12
   See application file for complete search history.

(56) References Cited

U.S. PATENT DOCUMENTS

| | | | | |
|---|---|---|---|---|
| 2011/0267486 | A1* | 11/2011 | Kane | H04N 5/23264 348/222.1 |
| 2015/0192510 | A1* | 7/2015 | Piestun | G01N 15/1456 702/151 |
| 2015/0293021 | A1* | 10/2015 | Finkelstein | G01N 21/6408 506/13 |
| 2016/0018889 | A1* | 1/2016 | Skogo | G06K 9/3233 348/78 |
| 2016/0275288 | A1 | 9/2016 | Sethumadhavan et al. | |
| 2017/0140240 | A1 | 5/2017 | Socher | |
| 2017/0140263 | A1 | 5/2017 | Kaiser et al. | |
| 2019/0164079 | A1* | 5/2019 | Gambetta | G06N 10/00 |

OTHER PUBLICATIONS

Romero et al., "Quantum autoencoders for efficient compression of quantum data," arXiv:1612.02806v2 [quant-ph], Feb. 14, 2017, 10 pages.
Stoudenmire et al., "Supervised Learning with Tensor Networks," 30th Conference on Neural Information Processing Systems (NIPS 2016), Barcelona, Spain and as published in Advances in Neural Information Processing Systems 29, 9 pages.
Wan et al. "Quantum generalisation of feedforward neural networks," arXiv:1612.01045v1 [quant-ph], Dec. 6, 2016, 10 pages.
Farhi et al. "A Quantum Approximate Optimization Algorithm," arXiv:1411.4028 [quant-ph], Nov. 14, 2014, 16 pages.
Farhi et al., "Quantum Algorithms for Fixed Qubit Architectures," arXiv:1703.06199v1 [quant-ph], Mar. 17, 2017, 20 pages.
Paroanu, "Microwave-induced coupling of superconducting qubits," arXiv:0801A541 [cond-mat.mes-hall], Jan. 30, 2008, 6 pages.
Chow et al., "A simple all-microwave entangling gate for fixed-frequency superconducting qubits," arXiv:1106.0553v1 [quant-ph], Jun. 3, 2011, 5 pages.
Nelder et al., "A simplex method for function minimization," The Computer Journal, pp. 308-313, 6 pages.
Spall, "Multivariate Stochastic Approximation Using a Simultaneous Perturbation Gradient Approximation," IEEE Transactions on Automatic Control, vol. 37, No. 3, Mar. 1992, pp. 332-341, 10 pages.
International Search Report and Written Opinion for International Application Serial No. PCT/IB2017/058266 dated Aug. 29, 2018, 9 pages.
Temme, et al., "Error Mitigation for Short-Depth Quantum Circuits," Physical Review Letters Nov. 3, 2017 (03.11.207) No. 18, vol. 19, 15 pages.
Bauer, et al., "Hybrid Quantum-Classical Approach to Correlated Materials," Physical Review X 6, 031045 (2016), 11 pages.
Wecker, et al., "Progress towards practical quantum variational algorithms," Phys. Rev. A 92, 042303—Published Oct. 2, 2015, 1 page.
First Examination Report received for GB patent application No. 2009136.9 dated Jul. 24, 2020, 5 pages.

* cited by examiner

SHORT DEPTH CIRCUITS AS QUANTUM CLASSIFIERS

BACKGROUND

The subject disclosure relates to implementing short depth circuits as quantum classifiers.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments, systems, computer-implemented methods, apparatus and/or computer program products that facilitate machine-learning classifier efficiency.

According to an embodiment, a system is provided that can comprise quantum hardware, a memory that stores computer-executable components and a processor that executes computer-executable components stored in the memory. In one or more implementations, the computer-executable components comprise a calibration component that calibrates quantum hardware to generate a short depth quantum circuit. The computer-executable components further comprise a cost function component that determines a cost function for the short depth quantum circuit based on an initial value for a parameter of a machine-learning classifier. The computer-executable components further comprise a training component that modifies the initial value for the parameter during training to a second value for the parameter based on the cost function for the short depth quantum circuit.

In another embodiment, a computer-implemented method is provided. In one example, the computer-implemented method comprises calibrating, by a system operatively coupled to a processor, quantum hardware to generate a short depth quantum circuit. The computer-implemented method can further comprise determining, by the system, a first cost function for the short depth quantum circuit based on an initial value for a parameter of a machine-learning classifier. The computer-implemented method can further comprise modifying, by the system, the initial value for the parameter during training to a second value for the parameter based on the first cost function for the short depth quantum circuit.

In another embodiment, a computer program product is provided, the computer program product comprising a computer readable storage medium having program instructions embodied therewith. The program instructions executable by a processor can cause the processor to at least calibrate quantum hardware to generate a short depth quantum circuit. The program instructions executable by a processor can further cause the processor to at least determine a cost function for the short depth quantum circuit based on an initial value for a parameter of machine-learning classifier. The program instructions executable by a processor can further cause the processor to at least modify the initial value for the parameter during training to a second value for the parameter based on the cost function for the short depth quantum circuit.

DETAILED DESCRIPTION

Figure 1:
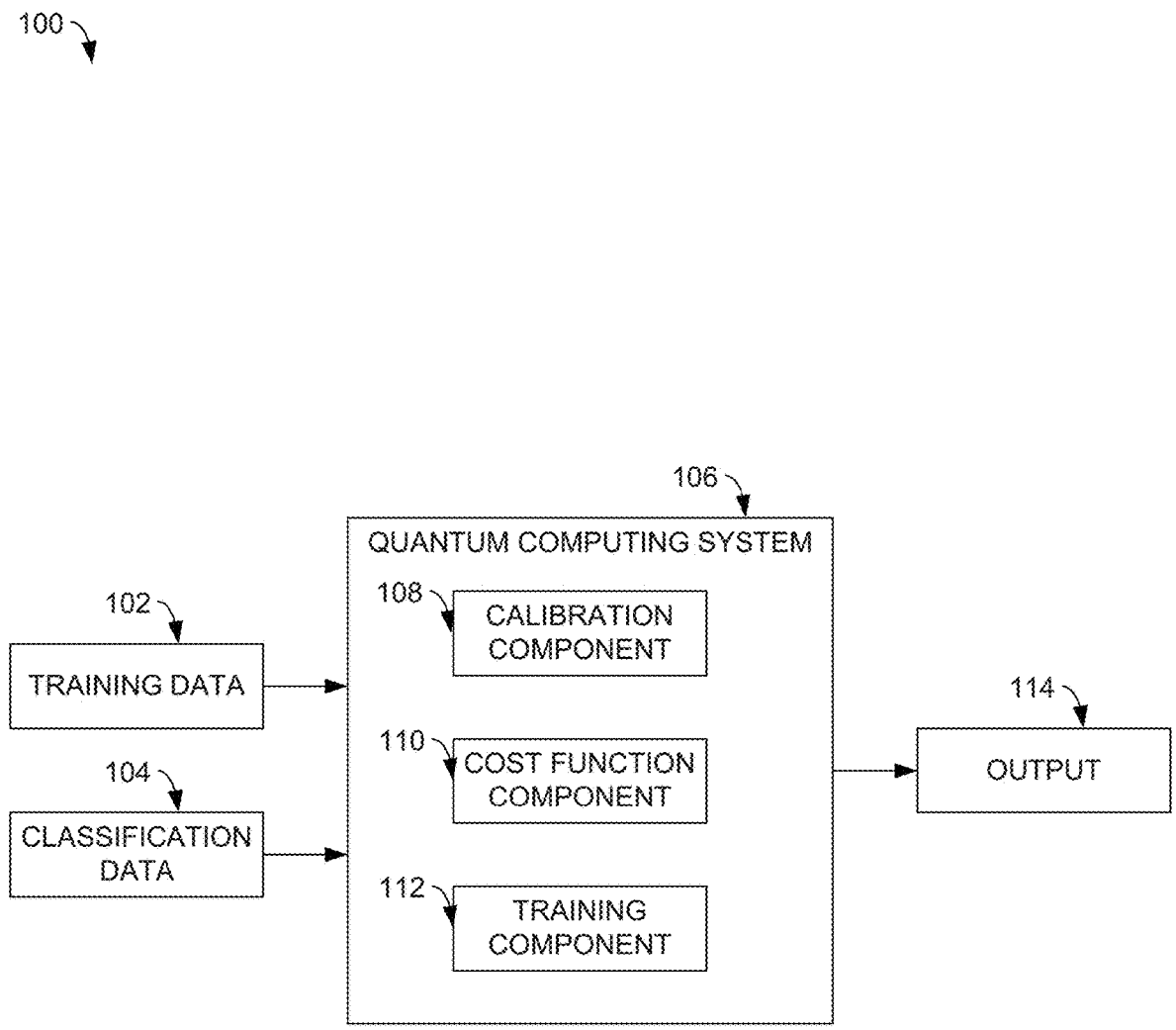
FIG. 1 illustrates an example, non-limiting quantum computing system for short depth circuits as quantum classifiers that can be implemented in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

The subject disclosure is directed to computer processing systems, computer-implemented methods, apparatus and/or computer program products that facilitate implementing short depth circuits as quantum classifiers. The subject disclosure can utilize both quantum computing and machine learning.

Quantum computing can generally be the use of quantum-mechanical phenomena in performing computing tasks. Quantum computing research has provided several algorithms that grant exponential speed ups over their best classical counterparts. Some quantum computing research can be focused on the development of new algorithms that have real world applications. Then, machine learning can generally be the development of computing systems that can learn to perform a particular task (such as classifying input data) without being explicitly programmed to perform that particular task.

Based on the above, one can investigate whether there are quantum algorithms that can provide speedups to problems relevant in machine learning. This intersection between machine learning and quantum computing can be referred to as quantum machine learning.

Short depth circuits can be generated efficiently on a quantum computer. For example, variational trial states (VQE) can be generated by unitary quantum circuits which can be optimized in a quantum—classical hybrid approach. Here the quantum computer can be used to evaluate the output and samples from the quantum circuits. At the same time, it is possible to describe machine learning classification problems in terms of quantum optimization problems.

Among the techniques described herein are two situations where the underlying matter can be a classification task. These two learning tasks can be solved using the optimization of hardware-efficient short-depth quantum circuits. One of these learning tasks involves learning a discriminating measurement when labeled samples of different quantum states are given. The discriminating measurement distinguishes the samples from the quantum distribution in a single shot with high probability. Another of these learning tasks involves classifying states or samples, when multiple measurements can be made.

Regarding classification tasks, consider a classification task on a set $C=\{0, 1, 2 \ldots c-1\}$ of c classes in a supervised learning scenario. In such settings, a training set T and a test set S are given, both of which are a subsets $T \cup S \subset \Omega$ of a n-dimensional bounded set $\Omega \subset \mathbb{R}^n$, and both are labeled by a map $m: T \cup S \rightarrow C$ that can be unknown to an entity that is developing a machine learning process to perform such classification. While both sets S and T are provided, and labels for the training set T are known, labels for the test S are unknown in the course of developing this machine learning process. So formally, the developer has only access to a restriction $m_{|T}$ of the indexing map m:

$$m_{|T}: T \rightarrow C, s.t.: m_{|T}(t)=m(t), \forall t \in T.$$

The developer, then, attempts to use the knowledge of $m_{|T}$ to infer an indexing map $$\tilde{m}: S \rightarrow C$$

over the set S, such that $$\tilde{m}: S \rightarrow C$$

with high probability for any member of S, s, s∈S. The accuracy of the approximation to the map can be quantified by a classification success rate, $v_{succ.}$, proportional to the number of collisions of m and $\tilde{m}$:

$$v_{succ.} = \frac{|\{s \in S \mid m(s) = \tilde{m}(s)\}|}{|S|}.$$

Where such a learning task can be considered to be meaningful, it can be assumed that there is a correlation in output of the indexing map m over the sets S and T. For at least that reason, it can be assumed that both sets could in principle be constructed by drawing the S and T sample sets $T \cup S \subset \Omega$ from a family of n-dimensional distributions $$\{p_c: \Omega \subset \mathbb{R}^n \rightarrow \mathbb{R}\}_{c \in C}$$

and labeling the outputs according to the distribution. It can be assumed that the hypothetical classification function m to be learned can be constructed this way. In this example, the developer, however, does not have access to these distributions of the labeling function directly. The developer can be provided only with a large, but finite, number of samples and the matching labels.

The conventional approach to this can be to construct a family of classically computable function $$\tilde{m}: \langle \vec{\theta}, S \rangle \rightarrow C.$$

indexed by a set of parameters, $\vec{\theta}$. These weights are then inferred from $m_{|T}$ by an optimization procedure (such as a stochastic gradient descent with back propagation) on a classical cost function. Further, a scenario can be disclosed where a classification protocol, m, can be generated from a quantum circuit depending on free parameters.

In an example, an approximation to the classification function $$\tilde{m}: \langle \vec{\theta}, S \rangle \rightarrow C.$$

is constructed. The free parameters are inferred from $m_{|T}$ by performing an optimization procedure on by gathering measurement outcomes, and combing them in to a cost function $C_F$. A scenario can be considered where classification protocol m can be generated from a short depth quantum circuit $W(\vec{\theta}, \vec{\varphi})$, depending on free parameters and a suitably chosen measurement operator M that can be implemented by using single qubit measurements. In the prior expression, W is a short depth quantum circuit depending on free parameters $\vec{\theta}$ and $\vec{\varphi}$. A classical optimization routine can be utilized that will converge to the optimal parameter values $(\vec{\theta}, \vec{\varphi})$. Several options exist that can be applied. As an example, simulated annealing for the cost function $C_F(\vec{\theta}, \vec{\varphi})$ could be performed. Other alternatives can be a Spall (or SPSA) gradient decent algorithm, or a Nelder-Mead (or NM) simplex algorithm. This approach can constitute a direct approach to minimizing the cost function of the short depth circuit $W(\vec{\theta}, \vec{\varphi})$.

In an example, a quantum classifier can be constructed on quantum hardware in three steps. First, a sample from the data $\vec{x} \in S, T$ can be mapped via a non-linear feature map $\Phi(\vec{x})$ to an initial quantum state $|\Phi(\vec{x})\rangle$. Then, a short depth hardware-efficient quantum circuit can be applied to the initial quantum state, which depends on the aforementioned free parameters $W(\vec{\theta}, \vec{\varphi})$, and finally the quantum measurement $\{M_l\}_{l=1, \ldots, c}$ can be applied. From the measurement outcome, the label can be constructed. In a single measurement outcome, this can be referred to as "quantum state discrimination," and from the collection of multiple measurement samples, this can be referred to as "quantum subspace tagging." The protocol can be separated in to two phases. First in the protocol can be the training phase, where labeled samples are provided and the measurement outcomes are combined in to cost function. This cost-function can then be minimized to find the best parameters for the circuit. Once the parameters have been found, we can enter the second phase—the classification phase. In the classification phase, unlabeled samples are provided that are to be classified. These unlabeled parameters are then classified with the optimal parameters of the trained circuit.

In some examples, the disclosed subject matter can include a new classifier based on quantum circuits that allows access to a larger feature space. In some examples, an optimal discriminating measurement can be learned from a few samples. In some examples, the disclosed subject matter can be applied to classification problems that utilize a large feature space. In some examples, the short depth circuit approach can be implemented with both current and near-term quantum hardware. In some examples, a tensor network with associated variational parameters, and cost function, operate with many types of optimization routines. In some examples, hardware efficient circuits correct for systematic coherent gate errors of a device. In some examples, a trained system can quickly make determinations. In some examples, tagging occurs in an exponentially-larger Hilbert space.

The computer processing systems, computer-implemented methods, apparatus and/or computer program products employ hardware and/or software to solve problems that are highly technical in nature (e.g., related to both machine-learning classifiers and quantum computers), that are not abstract and that cannot be performed as a set of mental acts by a human. For example, a human, or even thousands of humans, cannot efficiently, accurately and effectively manually analyze the voluminous amounts of content that can be processed by a machine-learning classifier (such as to classify images). One or more embodiments of the subject computer processing systems, methods, apparatuses and/or computer program products can enable utilizing short depth circuits as quantum classifiers. By employing short depth circuits as quantum classifiers, the processing time and/or accuracy associated with the existing machine-learning classifiers can be substantially improved.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It can be evident, however, in various cases, that the one or more embodiments can be practiced without these specific details.

FIG. 1 illustrates an example, non-limiting quantum computing system for short depth circuits as quantum classifiers that can be implemented in accordance with one or more embodiments described herein. Depicted in computing system 100, there is training data 102 and classification data 104, which are inputs to quantum computing system 106, and output 114, which is an output from quantum computing system 106. Quantum computing system 106 is an example quantum computer, which can be implemented via a combination of quantum computer 200 of FIG. 2 and the classical hardware of operating hardware 1201 of FIG. 12. It can be noted that quantum computer 200 of FIG. 2 can itself be implemented with a combination of quantum hardware and classical hardware, in some examples, and as described with respect to FIG. 2.

Quantum computing system 106 comprises three components: calibration component 108, cost function component 110, and training component 112. Calibration component 108 can be configured to calibrate quantum hardware to generate a short depth quantum circuit, and examples of this configuration are described with respect to operation 1102 of FIG. 11. Cost function component 110 can be configured to determine a cost function for the short depth quantum circuit based on an initial value for a parameter of a machine-learning classifier, and examples of this determination are described with respect to operation 1104 of FIG. 11. Training component 112 can be configured to modify the initial value for the parameter during training to a second value for the parameter based on the cost function for the short depth quantum circuit, and examples of this modification are described with respect to operation 1106 of FIG. 11.

Training data 102 can be provided as input to quantum computing system 106, and can be labeled training data used to train a machine-learning classifier that can be implemented on quantum computing system 106. Classification data 104 can also be provided as input to quantum computing system, and can be data that a trained machine-learning classifier that can be implemented on quantum computing system 106, that has been configured with training data 102, and can be data that can be classified by the trained machine-learning classifier. Output 114 can be an output result of running classification data 104 on the trained machine-learning classifier, and can also be an output result of running training data 102 on the machine-learning classifier.

Figure 2:
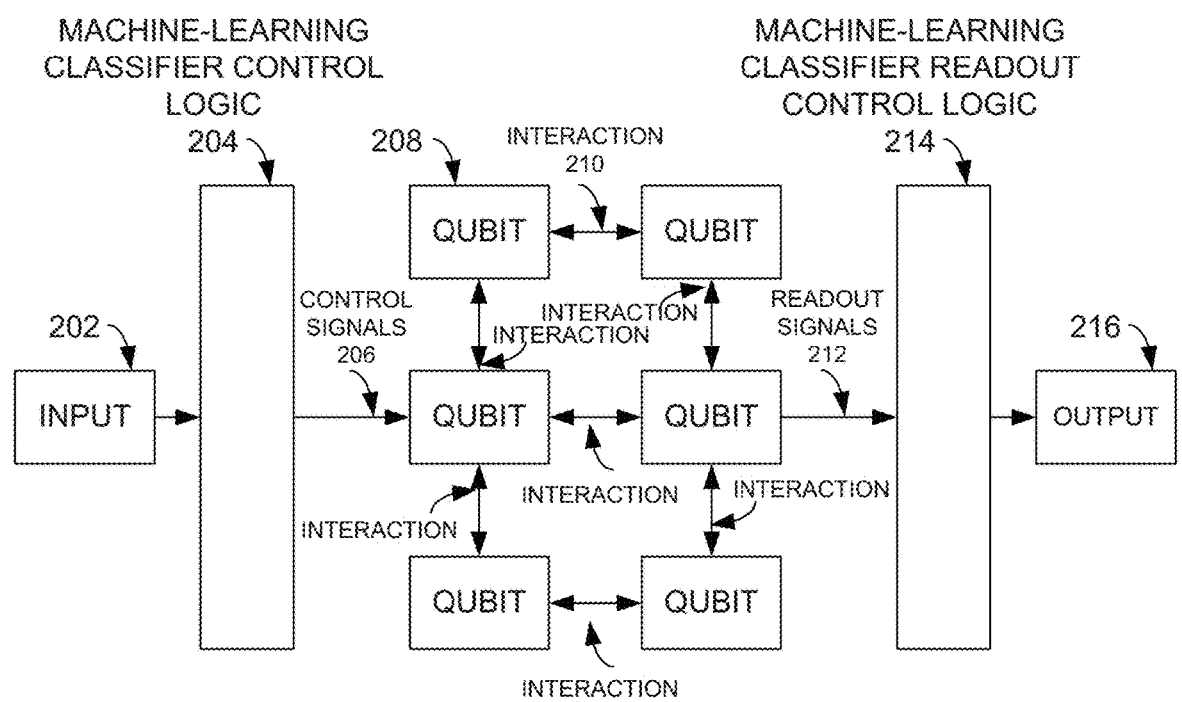
FIG. 2 illustrates a block diagram of an example, non-limiting system that facilitates implementing short depth circuits as quantum classifiers in accordance with one or more embodiments described herein.

FIG. 2 illustrates a block diagram of an example, non-limiting system that facilitates implementing short depth circuits as quantum classifiers in accordance with one or more embodiments described herein. Computing system 200 can be a quantum computer, which is sometimes referred to as quantum hardware. Quantum hardware generally utilizes one or more qubits (two-state quantum-mechanical system, where a qubit can be in a superposition of both of these states simultaneously), so can evaluate multiple operations simultaneously. Quantum hardware can be considered relative to classical computers, which are a one-state mechanical system.

More specifically, computing system 200 can be a simplified example of a superconductive quantum computer. It can be appreciated that aspects of the present disclosure can be implemented on a variety of quantum computing hardware, and that the quantum hardware of this example computing system 200 can be merely one such example that can be utilized to implementing aspects of the present disclosure. In some examples, computing system 200 can be used to implement aspects of quantum computing system 106.

Computing system 200 comprises input 202, machine-learning classifier control logic 204, control signals 206, qubit 208, interaction 210, readout signals 212, machine-learning classifier readout control logic 214, and output 216. Input 202 can be training data 102 or classification data 104, and output 216 can be output 114. Machine-learning classifier control logic 204 machine-learning classifier readout control logic 214 can be implemented using classical control logic in some examples. Machine-learning classifier control logic 204 can supply a sequence of gate operations to act on the qubits, such as qubit 208 by providing control signals 206 to the qubits. Machine-learning classifier readout control logic 214 can accept outputs from the qubits in the form of readout signals 212, and process these outputs to produce output 216. The depicted interactions, such as interaction 210, are interactions between the qubits, such as qubit 208.

The qubits are a two-state quantum-mechanical system, where a qubit can be in a superposition of both of these states simultaneously. The qubits can be constructed via a circuit comprising an inductor and a capacitor (sometimes referred to as an IC circuit).

Figure 3:
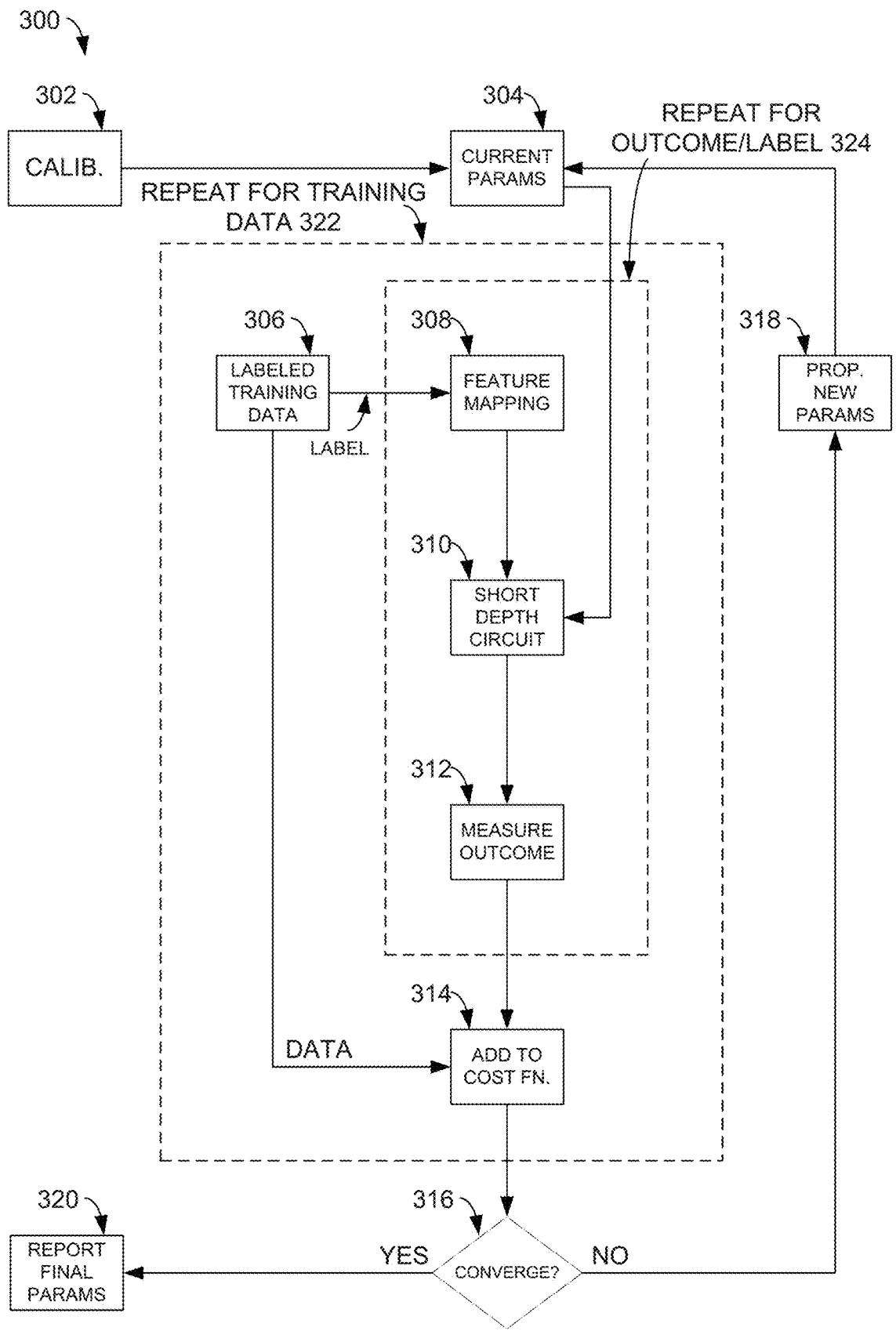
FIG. 3 illustrates a flow diagram of an example, non-limiting computer-implemented method that facilitates implementing short depth circuits as quantum classifiers during a training phase in accordance with one or more embodiments described herein.

FIG. 3 illustrates a flow diagram of an example, non-limiting computer-implemented method that facilitates implementing short depth circuits as quantum classifiers during a training phase in accordance with one or more embodiments described herein. In some examples, flow chart 300 can be implemented by quantum computing system 106 or computing system 200.

In flow diagram 300, a cost function can be computed for proposed parameters to a machine learning process that can be applied to labeled training set data. When this cost function converges sufficiently, the parameters are determined to be sufficiently trained. Flow diagram 300 can be used for a variety of different learning schemes. An example of such a learning scheme can be quantum state discrimination. Another example of such a learning scheme can be quantum subspace tagging. Quantum state discrimination and quantum subspace tagging generally differ in the way that measurement outcomes are evaluated and the cost function can be computed, so the same overall approach to training can be applied, while reflecting these differences.

In 302, quantum hardware can be calibrated (e.g., by quantum computing system 106 or computing system 200) to generate short depth trial circuits. Then, in 304, initial values of the variational parameters are chosen (e.g., by quantum computing system 106 or computing system 200) for hardware-efficient circuits.

The training data can be grouped according to labels, and then the following four operations (308-314) are applied (e.g., by quantum computing system 106 or computing system 200) for each of the samples in the training data—i.e., these operations are repeated for the outcome label 324. Feature mapping 308 can be performed, where, given a sample and its label, a feature map prepares a simple input state for the short depth circuit.

In a quantum circuit, the feature map can be an injective encoding of a classical information $$\vec{x} \in \mathbb{R}^n$$

into a quantum state $|\Phi\rangle$ (here a qubit register):

$$\Phi: \mathbb{R}^n \to \mathcal{H}_2^{\otimes N},$$

$$\vec{x} \mapsto |\Phi(\vec{x})\rangle.$$

Here $\mathcal{H}_2 = \mathbb{C}^2$ can be a single qubit Hilbert space, where $\mathcal{H}_2$ represents a Hilbert space and $\mathbb{C}^2$ represents complex numbers. A product state feature map can be utilized, which can be comprised of single qubit rotations $U(\theta) \in SU(2)$, on every qubit on the quantum circuit (in some examples) to implement the feature map. Such a rotation can be implemented on a single transmon qubit by sending appropriately configured microwave pulses to drive a single qubit gate.

The angles for a qubit can be a non-linear function $\theta: \vec{x} \to [0, 2\pi]^3$ in to the space of Euler angles for the individual qubits, so that the full feature map can be implemented according to:

$$\vec{x} \mapsto |\phi(\vec{x})\rangle = U(\theta_i(\vec{x}))|0\rangle.$$

for an individual qubit, so that $$\vec{x} \mapsto |\Phi(\vec{x})\rangle = \otimes_{i=1}^N |\phi_i(x)\rangle.$$

for the full qubit state.

One example for such an implementation can be unitary implementation of the feature map used in the classical analysis by Stoudenmire and Schwab where a qubit encodes a single component $x_i$ of $\vec{x} \in [0, 1]^n$ so that $N=n$ qubits are used. In some examples, each component of $\vec{x}$ can locally correspond to a "grayscale" value $x_i$. This single value can be represented by a quantum state:

$$|\phi(x_i)\rangle = \cos\left(\frac{\pi}{2}x_i\right)|0\rangle + \sin\left(\frac{\pi}{2}x_i\right)|1\rangle.$$

Note that, in this example, $\varphi_i(\vec{x}) = \varphi(x_i)$ can be the same map for all qubits and depends on a single component and the gate corresponds to $$U(\theta_i(\vec{x})) = \exp\left(i\frac{\pi}{2}x_i Y\right)$$

where Y can be the conventional Pauli Y operator and can be directly implemented as a single qubit rotation.

After feature mapping 308, a short depth circuit can be applied 310 (e.g., by quantum computing system 106 or computing system 200) from a hardware efficient circuit family, with some initially-chosen variational parameters. An outcome can be measured 312 (e.g., by quantum computing system 106 or computing system 200), where output statistics of the circuit are measured and assigned to a suitable cost function (where multiple cost functions can be used, or to a single cost function where a single cost function can be used). Then, the result can be added to the cost function 314 (e.g., by quantum computing system 106 or computing system 200).

In addition to the operations being repeated for the outcome label 324, the operations can also be repeated for training data 322 (e.g., by quantum computing system 106 or computing system 200). Labeled training data 306 can include a plurality of labeled training data, and can provide the data (e.g., by quantum computing system 106 or computing system 200) to feature mapping 308, and provide corresponding label information (e.g., by quantum computing system 106 or computing system 200) to updating the cost function 314.

After the cost function is updated in 314, a determination can be made as to whether the cost function has suitably converged 316 (e.g., by quantum computing system 106 or computing system 200). Where it is determined that the cost function has suitably converged, the parameters currently being used in training are designated as the parameters that have been determined through training 320 (e.g., by quantum computing system 106 or computing system 200). Instead, where it is determined that the cost function has not suitably converged, then an update rule can be applied to determine new parameters 318. This update rule can be based on a classical optimization routine. The operations 304, and 308-318 can be looped as depicted until sufficient convergence is reached in 318.

Figure 4:
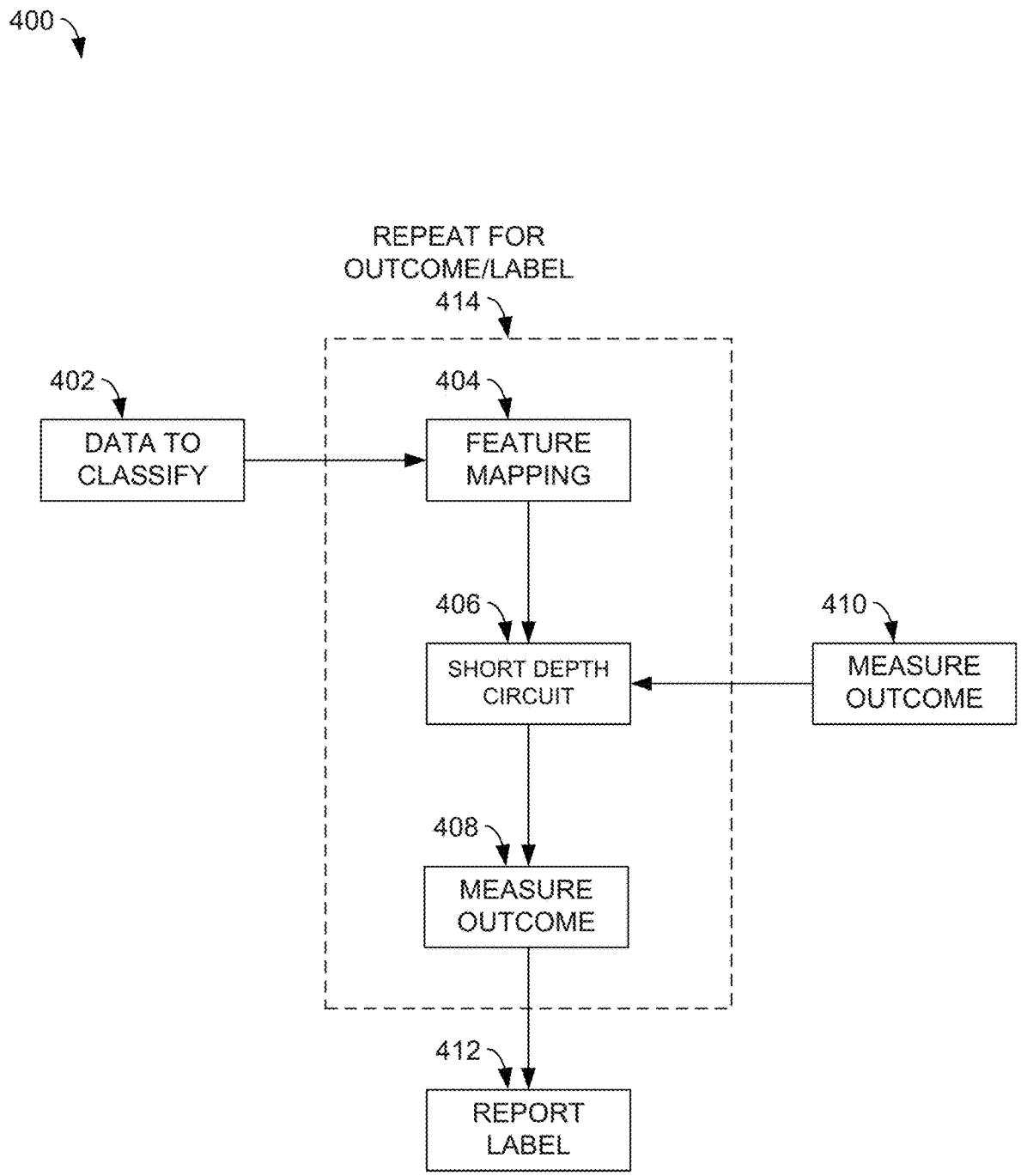
FIG. 4 illustrates a flow diagram of an example, non-limiting computer-implemented method that facilitates implementing short depth circuits as quantum classifiers during a classification phase in accordance with one or more embodiments described herein.

FIG. 4 illustrates a flow diagram of an example, non-limiting computer-implemented method that facilitates implementing short depth circuits as quantum classifiers during a classification phase in accordance with one or more embodiments described herein. In some examples, flow chart 400 can be implemented by quantum computing system 106 or computing system 200.

The classification phase of flow chart 400 can be implemented after the training phase of flow chart 300 is implemented. After the training phase is completed, the variational parameters determined during the training phase can then be used to determine a label for input data in the classification phase. As with flow chart 300, in flow chart 400 can be applied to a variety of different learning schemes, including both quantum state discrimination and quantum subspace tagging. In a classification phase, a quantum subspace tagging scheme can generally differ from a quantum state discrimination scheme in that multiple measurement outcomes are combined to determine a label.

A sample to classify can be determined, and data to classify 402 can be supplied to feature mapping 404 (e.g., by quantum computing system 106 or computing system 200). Feature mapping 404 prepares the data as an input quantum state (e.g., by quantum computing system 106 or computing system 200). Then, short depth quantum circuit 406 can be run, and can be run with the variational parameters determined in the training phase of flow chart 300 (e.g., by quantum computing system 106 or computing system 200). The output of the circuit can be measured 408 (e.g., by quantum computing system 106 or computing system 200), and a classification label can be assigned to the data and the label can be reported 412 (e.g., by quantum computing system 106 or computing system 200). In some examples, 404-408 are repeated for multiple outcome labels 414.

Regarding quantum state discrimination, and quantum subspace discrimination, the following approaches can be taken to determine a discriminator (in the case of quantum state discrimination) or separating plane (in the case of quantum subspace tagging) to utilize.

In some examples, to determine an optimal state discriminator, a labeled ensemble can be considered that is drawn either from a labeled family of classical distribution $p_c(x)$. The samples can be mapped using the feature map $$\phi: \mathbb{R} \to \mathbb{C}^N$$

where N can be the quantum computer's Hilbert space dimensionality, compressing the classical information to quantum states for the samples. In result, multiple copies of the following set of states on $\mathbb{C}^N$ can be accessed:

$$\rho_B = \frac{1}{|T \cup S|} \sum_{y^c \in (T \cup S)} |\phi(y^c)\rangle\langle\phi(y^c)|.$$

After receiving the ensemble, the corresponding labels $m_{|T}$ can also be received. So, many copies of two ensembles, $\rho_A^T$ (training) and $\rho_A^S$ (test) can be accessed, where the test set no longer carries labels:

$$\rho_A^T = \frac{1}{|T|} \sum_{y^c \in T} |\phi(y^c)\rangle\langle\phi(y^c)|,$$

$$\rho_A^S = \frac{1}{|S|} \sum_{y \in S} |\phi(y)\rangle\langle\phi(y)|.$$

Here, a general strategy to determine final labeling map m can be to make a set of measurements on the training set, collect statistics and come up with a discrimination rule that labels the ensembles. For the training samples $|y^c\rangle \in T$, a POVM $\{M_{c'}\}_{c'}$ can be applied to obtain the outcome c' with probability:

$$P(c'|y^c) := Tr(M_{c'}|\phi(y^c)\rangle\langle\phi(y^c)|_\phi) = \langle y^c|M_{c'}|\phi(y^c)\rangle$$

and labels according to this probability distribution. Two example classification scenarios are considered, one in which the outcome can be drawn according to the estimated probability distribution on labels this can be equivalent to standard quantum state discrimination. An alternative example classification scenario can also be considered, where the outcome can be drawn with maximum probability, and hence rather tries to distinguish (and "tag") the subspaces the ensembles are located in. Both scenarios do fit in the example framework, and differ in terms of the measurement strategy and cost-function.

Returning to the first example classification scenario, that of a single shot binary discriminator, where an orthogonal two-outcome measurement $M=\{M_0, M_1|M_0+M_1=1\}$ can be used to discriminate between two states $\rho_0$ $\rho_1$, such as for example $\rho_A^T$ and $\rho_A^S$. The averaged quantum state on a balanced set can be written as:

$$\rho = \frac{1}{2}(\rho_0 + \rho_1).$$

The assumed use of single shot measurements or equivalently m̃ being drawn from the output distribution of the circuit can then be used to construct the two-outcome measurement M. The probability $P_{dist}$ of distinguishing the two ensembles $\rho_0$ $\rho_1$ by a single outcome from the output distribution is then given by:

$$P_{dist} = \frac{1}{2}(Tr(M_0\rho_0) + Tr(M_1\rho_1)) = \frac{1}{2}(1 + Tr(M_1(\rho_1 - \rho_0))).$$

In the theoretical limit of having perfect knowledge of the ideal distribution $p_{0/1}$ the probability $\rho_{dist}$ of distinguishing the resulting states can be bounded by:

$$P_{dist} = \frac{1}{2}(Tr(M_0\rho_0) + Tr(M_1\rho_1))$$

$$= \frac{1}{2}\left(1 + \int_\Omega d\theta_i (p_0(\theta_i) - p_1(\theta_i))\underbrace{\langle\theta_i|M_0|\theta_i\rangle}_{\in[0,1]}\right) \le$$

$$\frac{1}{2}\left(1 + \int_\Omega d\theta_i (p_0(\theta_i) - p_1(\theta_i))I_{p_0 \ge p_1}\right)$$

=where characteristic function $I_{p_0 \ge p_1}$ is 1 if $(p_0 \ge p_1)$, and 0 otherwise. Now:

$$\|p_0 - p_1\| = \frac{1}{2}\int_\Omega |p_0 - p_1| = \int_\Omega (p_0 - p_1) I_{p_0 \ge p_1}.$$

Hence, $\rho_{dist}$ can be bounded in terms of the total variational distance of $p_0$ and $p_1$:

$$P_{dist} \le \frac{1}{2} + \frac{1}{2}\|p_0 - p_1\|,$$

which gives the fundamental resolution limit. In the scenario where a finite number of samples are received (equivalent number out of each class), actual training set T can be an approximation of $\rho_0, \rho_1$ given by:

$$\tilde{p}_0 = \frac{2}{|T|} \sum_{s^0 \in T} |\phi(s^0)\rangle\langle\phi(s^0)|$$

$$\tilde{p}_1 = \frac{2}{|S|} \sum_{s^1 \in T} |\phi(s^1)\rangle\langle\phi(s^1)|.$$

Suppose a measurement $W^\dagger MW$ is applied, where W ($\theta$, $\varphi$) is a short-depth quantum circuit. Furthermore, in this example, M is chosen to correspond to a simple binary outcome measurement in the computational basis. It can for example be a parity measurement with $M_i = 1 + (-1)^i Z^{\otimes N}/2$ for $i \in \{0,1\}$, or a classical decoder which can match to the two nearest code words. Many other simple measurements can be constructed. Then, the following equations are obtained:

$$|T|P_{err} = \sum_{s^0 \in T} \underbrace{\langle\phi(s^0)|W^\dagger M_1 W|\phi(s^0)\rangle}_{\in[0,1]} + \sum_{s^1 \in T} \underbrace{\langle\phi(s^1)|W^\dagger M_0 W|\phi(s^1)\rangle}_{\in[0,1]}$$

$$= \sum_{s^0 \in T} |\langle\phi(s^0)|W^\dagger M_1 W|\phi(s^0)\rangle| + \sum_{s^1 \in T} |\langle\phi(s^1)|W^\dagger M_0 W|\phi(s^1)\rangle|$$

$$= \sum_{s^0 \in T} |\langle\phi(s^0)|W^\dagger M_1 W|\phi(s^0)\rangle| +$$

$$\sum_{s^1 \in T} |\langle\phi(s^1)|W^\dagger (1-M_1) W|\phi(s^1)\rangle|$$

$$= \sum_{s \in T} |\delta_s^1 - \langle\phi(s)|W^\dagger M_1 W|\phi(s)\rangle|$$

which can be rewritten as:

$$P_{err} = \frac{1}{|T|} \sum_{t \in T} |\delta_t^1 - \langle\phi(t)|W^\dagger M_1 W|\phi(t)\rangle|.$$

The optimal discrimination procedure for a two outcome, single shot scenario, can be given by minimizing the above probability.

Since these terms are non-negative, the minima of the error probability Pen coincide with the minima of the following cost function:

$$C_F = \frac{1}{|T|^2} \sum_{t \in T} |\delta_t^1 - \langle\phi(t)|W^\dagger M_1 W|\phi(t)\rangle|^2.$$

which constitutes a natural cost function for the classification task at hand.

The following example involves a single shot multi label discriminator. In this example, and relative to a single shot binary discriminator, the final measurement M can be modified to correspond to multiple partitions. This modification can be achieved in multiple ways. For example, one could choose to measure again in the computational basis, i.e. the basis in which Pauli-Z are diagonal, and then construct classical labels form the measured samples, such as a labeling outcome $z \in \{0, 1\}^N$ according to the Hamming weight modulo C $l=|z| \mod c$ for which $M_l$ is also diagonal in the computational basis. Alternatively, one could construct a commuting measurement such as quantum stabilizers $\{g_i\} i=1 \ldots \lceil \log_2(c) \rceil$ for $g_i \in \mathcal{P}_N$ an element of the N-qubit Pauli group. that are commuting $[g_i, g_j]=0$, and then measure according to an error correcting scheme.

The resulting measurement operators are then given by $$M_l = (1 - \Pi_{i=1}^{\lceil \log 2(c) \rceil} g_i^{l_i})/2$$

where $l_i$ denotes the i'th bit in the binary i=1 i representation of l. In either approach, the resulting cost function to be minimized can then be $$C_F = \frac{1}{|T|} \sum_{l \in C} \sum_{s^l \in T} \langle\phi(s^l)|W^\dagger M_l W|\phi(s^l)\rangle.$$

over all the short depth circuits in the family W (θ, φ) using a classical optimization routine.

Turning now to quantum subspace tagging, the following approach can be utilized to determine a separating plane. A goal can be to find an optimal separating plane between the two density matrices discussed previously. In other words, an aim can be to indicate (or tag) each of the $2^n$ subspaces with 0 and 1, such that each state with support the appropriate subspace can be assigned the right label. Since there can be access to multiple copies of a same state, a 'winner takes all' scenario can be considered, where an outcome can be drawn with maximum probability as follows (where argmax identifies a maximum of a plurality of values):

$$\tilde{m}_{|T}(s) = \underset{c'}{\mathrm{argmax}} \langle\phi(s)|M_{c'}|\phi(s)\rangle.$$

This corresponds to taking multiple samples in order to estimate the largest outcome probability from the outcome statistics of the measurement $M_l$ for l=1, ..., c. Labelling $T_c$ the subset of samples T labelled with c, the overall expected misclassification rate can be given by:

$$P_{err} = \frac{1}{|T|} \left( \sum_c \sum_{s \in T_c} Pr(\tilde{m}_{|T}(s) \neq c \mid s \in T_c) \right).$$

A suitable cost function for this classification scheme can be determined.

Turning now to a binary label classification example, a first classification can be performed on two labels and odd N. The error probability $$Pr(\tilde{m}_{|T}(s) \neq c \mid s \in T_c)$$

for samples $\in T_c$ can be estimated by drawing a finite number of samples. Suppose that R samples are taken from the output distribution P over the labels and $r_c$ samples are drawn with label c. Then, the probability of misclassifying a label c according to the argmax rule can be given by:

$$Pr(\tilde{m}_{|T}(s) \neq c \mid s \in T_c) = Pr\left(r_c < \left\lceil \frac{R}{2} \right\rceil \right) = \sum_{k=0}^{R/2} \binom{R}{k} p_c^k (1-p_c)^{R-k}.$$

Assuming R is large, computing this exactly can be difficult. Setting R $p_c$=a, R $p_c$ (1−$p_c$)=$b^2$ and defining the variable γ=R/2, where γ is gamma, the binomial CDF can be approximated as an error function, erf:

$$Pr(\tilde{m}_{|T}(s) \neq c \mid s \in T_c) = \sum_{k=0}^{R/2} \binom{R}{k} p_c^{N-k} (1-p_c)^k \approx$$

$$\int_{-\infty}^{\gamma} dx \frac{1}{\sqrt{2\pi} b} \exp\left(-\frac{1}{2}\left(\frac{x-a}{b}\right)^2\right)$$

$$= \frac{1}{\sqrt{\pi}} \int_{-\infty}^{\frac{\gamma-a}{\sqrt{2}b}} dz e^{-z^2} = \frac{1}{2} \mathrm{erf}\left(\frac{\gamma-a}{\sqrt{2}b}\right) + \frac{1}{2}$$

$$= \frac{1}{2} \mathrm{erf}\left(\sqrt{2} \frac{\frac{1}{2} - p_c}{\sqrt{2(1-p_c)p_c}}\right) + \frac{1}{2}.$$

Graph 600 further illustrates this. The error function can be consequently approximated with a sigmoid:

$$sig(x) := \frac{1}{1+\exp(-x)} \approx \frac{1}{2}(\text{erf}(x)+1)$$

which gives:

$$Pr(\tilde{m}_{|T}(s) \neq c \mid s \in T_c) \approx sig\left(\sqrt{R}\,\frac{0.5 - p_c}{\sqrt{2(1-p_c)p_c}}\right).$$

The cost function we thus aim to minimize by appropriate choice of the $\{M_c\}_c$ POVM is then be given by:

$$P_{err} = \frac{1}{|T|}\sum_{s \in T}\left|\delta_c^1(s) - sig\left(\sqrt{N}\,\frac{0.5 - p_c(s)}{\sqrt{2(1-p_c(s))p_c(s)}}\right)\right|$$

where $p_c$ is estimated over N for every s in T with label c=0,1.

For multiple label classification, in some examples, the following error is to be optimized:

$$P_{err} = \frac{1}{|T|}\sum_c \sum_{s \in T_c} Pr(\tilde{m}_{|T}(s) \neq c \mid s \in T_c)$$

where $$Pr(\tilde{m}_{|T}(s) \neq c \mid s \in T_c) = Pr\!\left(n_c < \max_{c'}(\{n_{c'}\}_{c'/c})\right).$$

For N samples with frequencies $\{n_0, n_1, n_2\}$, drawn independently from the output probability distribution, the probability of misclassifying a sample $s \in T_0$ by argmax can be given by:

$$Pr(\tilde{m}_{|T}(s) \neq 0 \mid s \in T_0) = Pr(n_0 < \max(n_1 \cdot n_2)) = Pr\!\left(n_0 < \left\lceil\frac{N+|n_1-n_2|}{3}\right\rceil\right)$$

where the last inequality can be derived as follows:

$$2n_0 < 2\max(n_1, n_2) = |n_1 - n_2| + n_1 + n_2 = |n_1 - n_2| + N - n_0.$$

Hence setting $$\gamma = \frac{N + |n_1 - n_2|}{3},$$

it follows that:

$$Pr(\tilde{m}_{|T}(s) \neq 0 \mid s \in T_0) = \sum_{k=0}^{k=\gamma}\binom{N}{k}p_0^k(1-p_0)^{N-k} \approx sig\!\left(\frac{\gamma - Np_0}{\sqrt{2N(1-p_0)p_0}}\right).$$

In the current example, this depends on $n_1, n_2$. Additionally, in an example that comprises a general k-label case, it can be that there is no simple analytic solution for $\gamma$. For this reason, the above probability can therefore be estimated by simply taking $$\gamma = \max_{c'}(\{n_{c'}\}_{c'/c}).$$

So, for a k-label case, the cost function terms can be approximated by:

$$Pr(\tilde{m}_{|T}(s) \neq c \mid s \in T_c) \approx sig\!\left(\sqrt{N}\,\frac{\max_{c'}(\{n_{c'}\}_{c'/c}) - n_c}{\sqrt{2(N-n_c)n_c}}\right).$$

Figure 5:
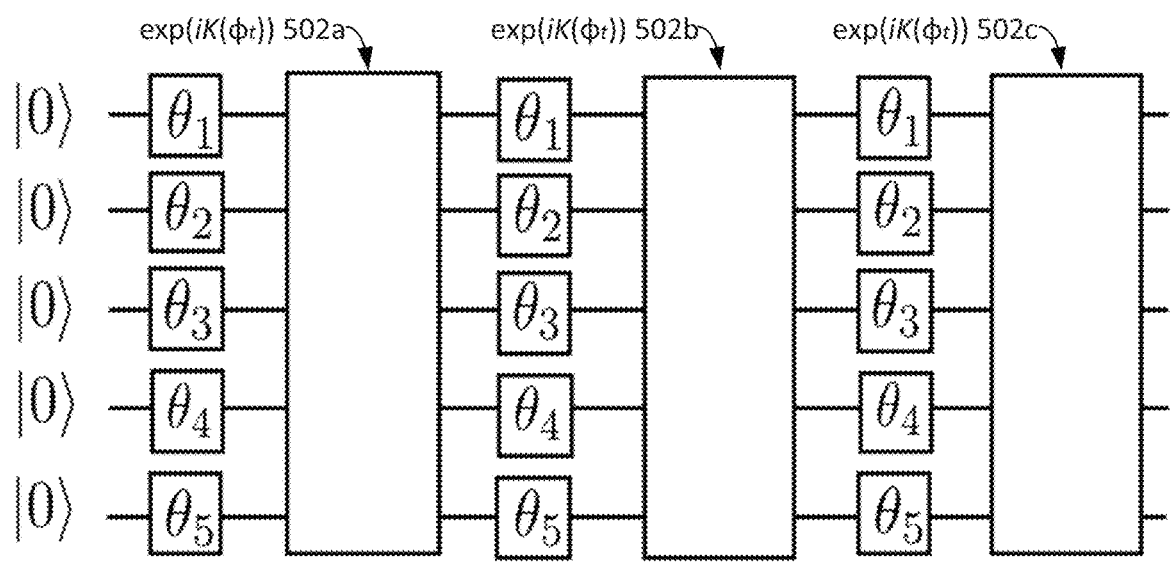
FIG. 5 illustrates a circuit representation of an example, non-limiting hardware-efficient short depth quantum circuit that can be used to implement short depth circuits as quantum classifiers in accordance with one or more embodiments described herein.

FIG. 5 illustrates a circuit representation of an example, non-limiting hardware-efficient short depth quantum circuit that can be used to implement short depth circuits as quantum classifiers in accordance with one or more embodiments described herein. In some examples, circuit 500 can be utilized to implement aspects of quantum computing system 106 or computing system 200.

Some example short depth quantum circuits utilize a coherently controllable quantum mechanical system, such as a superconducting chip with N transmon qubits to prepare a short depth quantum circuit $W(\vec{\theta}, \vec{\varphi})$ that can be comprised of the following single qubit and multi-qubit gates $$W(\vec{\theta}, \vec{\varphi}) = U_{ent}^{(d)}(\varphi_d)U_{loc}^{(d)}(\theta_d)\ldots U_{ent}^{(1)}(\varphi_1)U_{loc}^{(1)}(\theta_1).$$

by applying a circuit of d repeated drift steps as depicted in circuit 500, which can be comprised of local single qubit rotations $$U_{loc}^{(t)}(\theta_t) = \bigsqcup_{i=1}^{N} U(\theta_{i,t}) \text{ and } U(\theta_{i,t}) \in SU(2)$$

parametrized by $\vec{\theta} \in \mathbb{R}^{3N}$. Furthermore, in some examples, entangling interaction 502a, entangling interaction 502b, and entangling interaction 502c can be applied as follows:

$$U_{ent}^{(t)}(\varphi_t) = \exp(iK(\varphi_t)), \text{ where } K(\varphi_t) = \sum_\alpha J_\alpha(\varphi_t)\sigma(\alpha)$$

which depend on some real parameters $\vec{\theta} \in \mathbb{R}^{3N}$ for every $\sigma(\alpha) \in \mathcal{P}_N$. There can exist multiple choices for the entangling unitaries $U_{ent}^{(t)}(\varphi_t)$.

As an example, to illustrate an approach, cross-resonance gates are applied which implies that the entangling Unitary between qubit k and 1 can be generated by the two-local effective Hamiltonian can be given as a combination of X and Z single qubit Pauli operators by $$h_{k,l} = aZ_k + bZ_l + c_{k,l}Z_kZ_l + d_{k,l}(1-e_{k,l})X_k + d_{k,l}e_{k,l}X_kZ_l.$$

The parameters $a, b, c_{k,l}, d_{k,l}, e_{k,l}$ can be determined by the hardware of the superconducting circuit. This means a natural drift evolution K, can, for example, be given by $$K(\varphi_t) = \sum_{k<l} J_{kl}(\varphi_t)h_{k,l}$$

where the $J_{kl}(\varphi_t)$ can be tuned by the experiment. When applied to an initial product state $|0\rangle^N$, the first set of single qubit rotations can be used to implement a single qubit feature map to implement that data. Then the resulting state can be obtained:

$$|\psi(\vec{\theta}, \vec{\varphi})\rangle = U_{ent}^{(d)}(\varphi_d)U_{loc}^{(d)}(\theta_d)\ldots U_{ent}^{(1)}(\varphi_1)$$
$$U_{loc}^{(1)}(\theta_1(\vec{x}))|0^m\rangle.$$

which corresponds to the graphical representation of circuit 500. This bang-bang controlled short-depth circuit can correspond to a general state that can be prepared on the physical quantum hardware if limited to a maximal set of K subsequent iterations of applying control pulses and permitted drift times to generate entanglement. In some examples in a general approach, the entangling unitary can be effectively generated from $h_{k,l}$, by applying bang bang control pulses, which extends the circuit depth and allow for the introduction of additional coherent errors by restricting the variation over the control parameters. Hence, the control pulses can be optimized in the presence of the native drift Hamiltonian directly. Since the set of drifts $\{h_{kl}\}$ together with single control pulses $U_{loc}(\theta)$ can be universal, in some examples, any state can be prepared this way with sufficient circuit depth.

In circuit 500, a circuit representation of Hardware-efficient short depth quantum circuit can be presented. The single qubit rotations $U(\theta_{i,t}) \in SU(2)$ are depicted by single line boxes parametrized by the angles $\theta_i$, while the native entangling operation $\exp(iK(\varphi_t))$ 502a, 502b, and 502c can be determined by the cross-resonance gates of a superconducting chip. Note that the first layer of single qubit rotations can be typically used to encode the data to be classified so that $\theta_i = \theta_i(\vec{x})$ for the first row of qubits after the pure state preparation.

Figure 6:
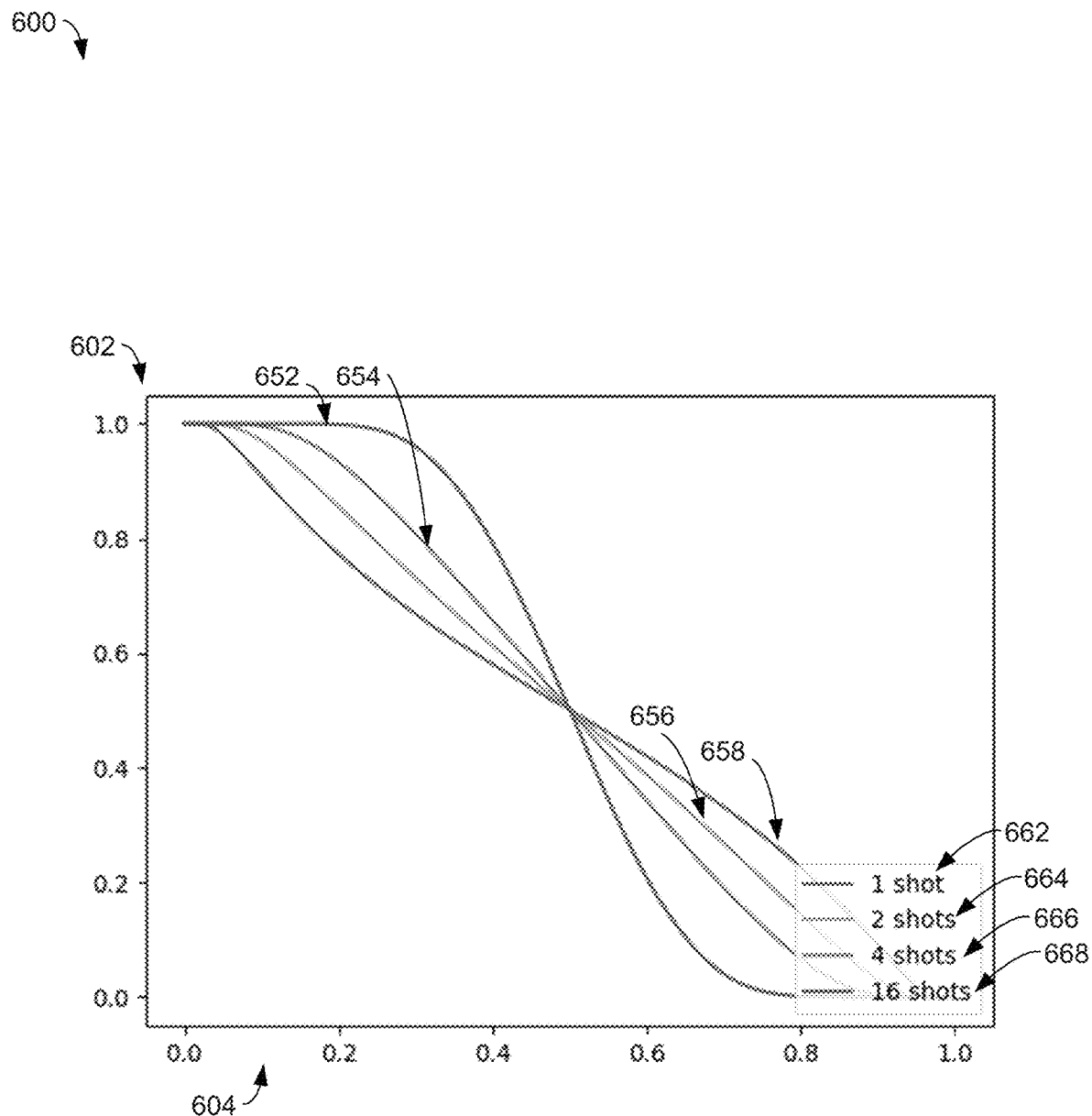
FIG. 6 illustrates an example, non-limiting graph that plots how a cost function varies with respect to a number of shots for short depth circuits as quantum classifiers in accordance with one or more embodiments described.

FIG. 6 illustrates an example, non-limiting graph that plots how a cost function varies with respect to a number of shots for short depth circuits as quantum classifiers in accordance with one or more embodiments described. Line 652 is a plot using one shot 662. Line 654 is a plot using two shots 664. Line 656 is a plot using four shots 666. Line 658 is a plot using 16 shots 668. This cost function can be a cost function associated with a machine-learning classifier that can be implemented using computing system 100 or computing system 200.

Graph 600 depicts single shot to multi shot subspace discrimination. The decision function interpolates from linear (Helstrom) to logistic-normal CDF (approximately sigmoid). The log-normal CDFs are used in ANNs for improvement in optimization, which indicates that this can be acceptable for use. Graph 600 has a y-axis 602 that represents $Pr(m=1)$, and an x-axis 604 that represents p1.

Figure 7:
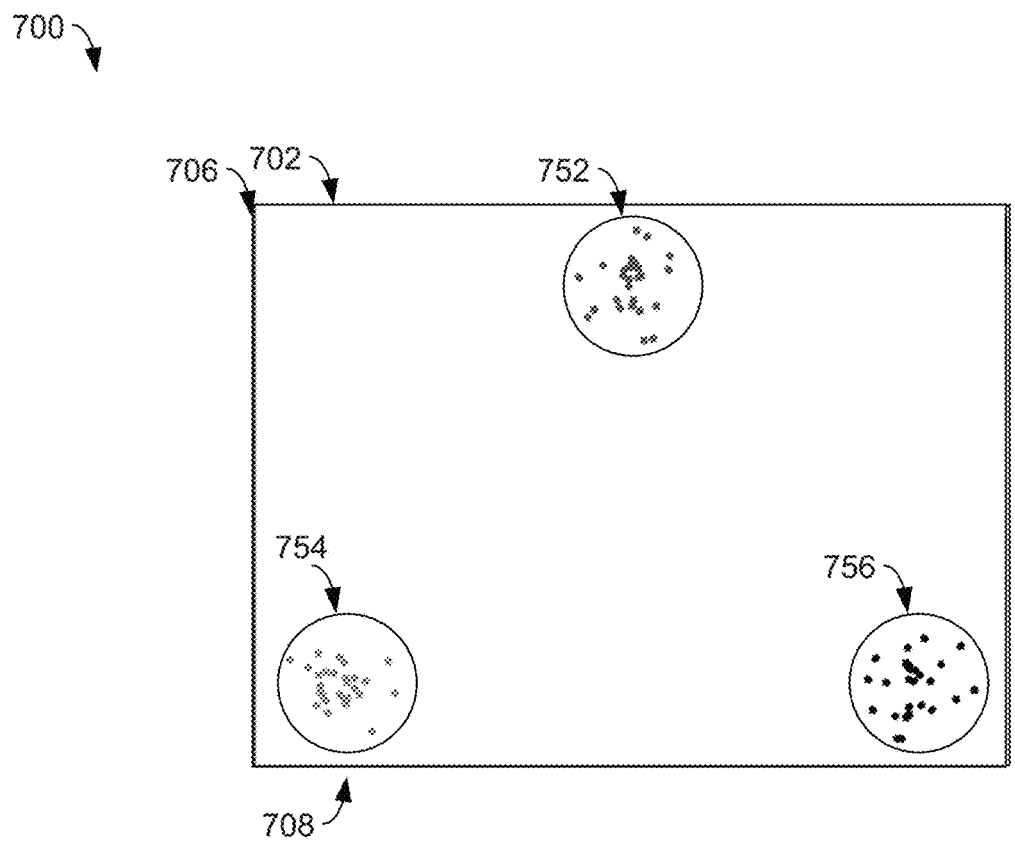
FIG. 7 illustrates example, non-limiting graphs that plot a performance of short depth circuits as quantum classifiers in a three-label example where the samples are drawn from three well-separated Gaussians, in accordance with one or more embodiments described.
Figure 7:
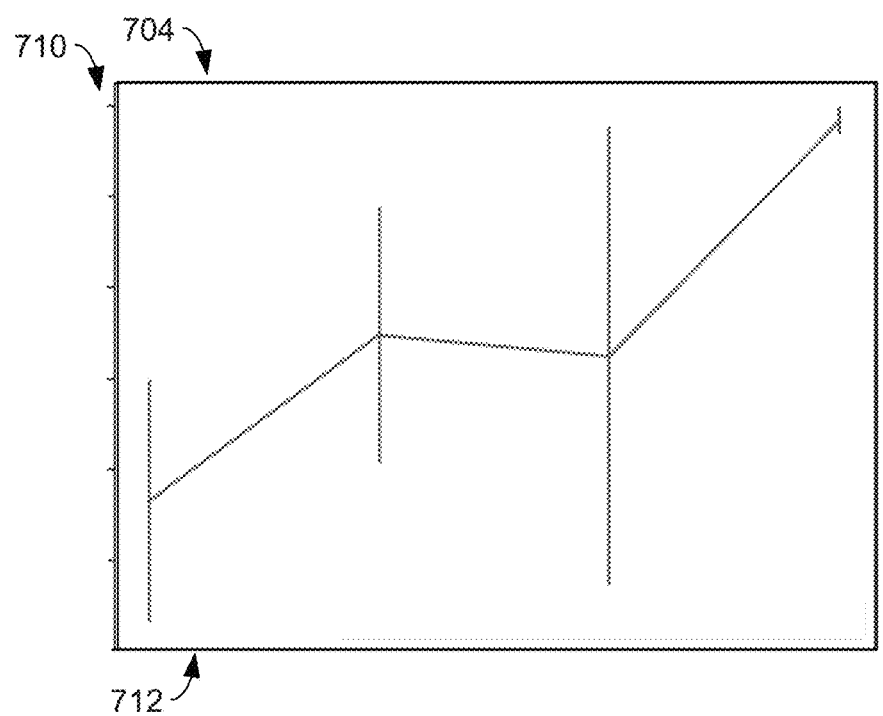

FIG. 7 illustrates an example, non-limiting graph that plots a performance of short depth circuits as quantum classifiers in a three-label example where the samples (grouped as 752, 754, and 756) are drawn from three well-separated Gaussians, in accordance with one or more embodiments described. This performance can be a performance associated with a machine-learning classifier that can be implemented using computing system 100 or computing system 200. Graphs 700 depict a three-label example. Here, performance can be considered where samples are drawn from three well separated Gaussians as shown in graph 702, and the simulation can be run with 1 training sample per label, and 25 test samples, with a result as shown in graph 704. Graph 702 has a y-axis 706 that represents one value for the sample data, and an x-axis 708 that represents a second value for the sample data. Graph 704 has a y-axis 710 that represents a success ratio, and an x-axis 712 that represents a number of layers.

In this following example, it can be assumed that there is access to measurements in computational basis and classifiers by grouping the measurement outcomes over a finite number of shots into c different categories. It can be determined to control classification measurements with a quantum circuit W parametrized by a set of real-valued parameters $\vec{\theta}$, $\vec{\lambda}$, $\vec{\varphi}$. In this example, the family of W circuit can allow for arbitrary single qubit unitaries, and also generically correlate the inputs along the interaction graph E. Based on these considerations, the following short depth circuit can be used:

$$W = \prod_{t=1}^{L} \left( U_3(\vec{\theta}_l, \vec{\lambda}_l, \vec{\phi}_l) \underbrace{\prod_{(i,j) \in E} CZ(i,j)}_{U_{ent}} \right) U_3(\vec{\theta}_0, \vec{\lambda}_0, \vec{\phi}_0)$$

where $$U_3(\vec{\phi}_l, \vec{\theta}_l, \vec{\lambda}_l) := e^{-iZ\frac{\vec{\phi}_l}{2}} e^{-iY\frac{\vec{\theta}_l}{2}} e^{-iZ\frac{\vec{\lambda}_l}{2}}$$

are a single qubit Euler rotations and L controls the number of entangling layers. In this example, a classical black box optimization (e.g., SPSA) process can be used to find optimal parameters, such that the argmax of $WM_C W^\dagger$ on the input state from test set is c with high probability. In this example, for numerical simplicity the $$U_{ent} = \Pi_{(i,j) \in E} CZ(i,j)$$

is modeled at every step, choosing the topology of E as the interaction graph of an ibmqx4 superconducting chip or a suitable subgraph thereof and acting with controlled phase gates CZ between the qubits i,j connected by a link in E.

Figure 8:
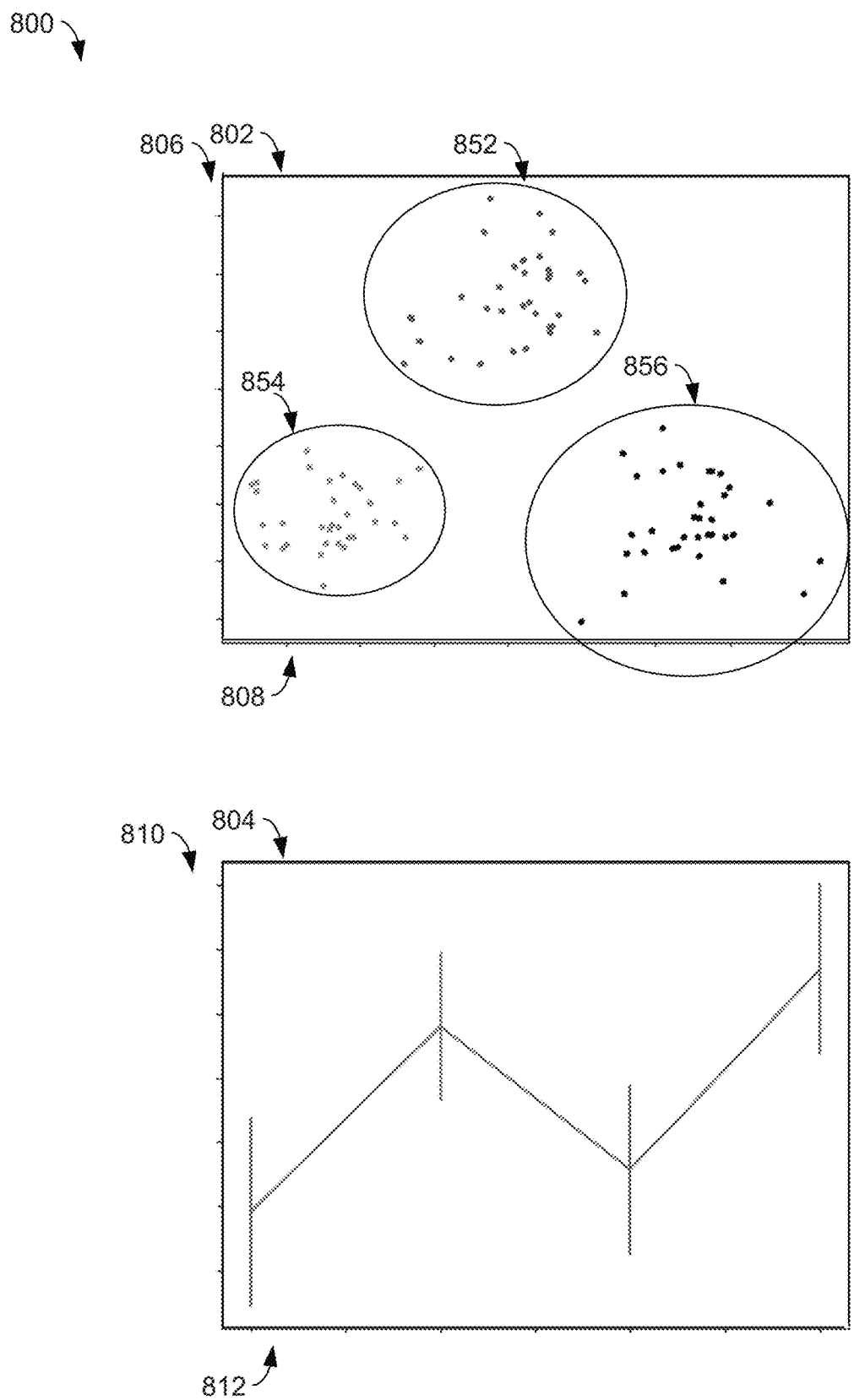
FIG. 8 illustrates example, non-limiting graphs that plot a performance of short depth circuits as quantum classifiers in a three-label example where the samples are drawn from three spread-out Gaussians, in accordance with one or more embodiments described.

FIG. 8 illustrates example, non-limiting graphs that plot a performance of short depth circuits as quantum classifiers in a three-label example where the samples (grouped as 852, 854, and 856) are drawn from three spread-out Gaussians, in accordance with one or more embodiments described. This performance can be a performance associated with a machine-learning classifier that can be implemented using computing system 100 or computing system 200. Graphs 800 depict another three-label example, relative to the three-label example of graphs 700. Here, performance can be considered where samples are drawn from spread out Gaussians as shown in graph 802, and the simulation can be run with 1 training sample per label, and 25 test samples, with a result that is shown in graph 804. Graph 802 has a y-axis 806 that represents one value for the sample data, and an x-axis 806 that represents a second value for the sample data. Graph 804 has a y-axis 810 that represents a success ratio, and an x-axis 812 that represents a number of layers.

Figure 9:
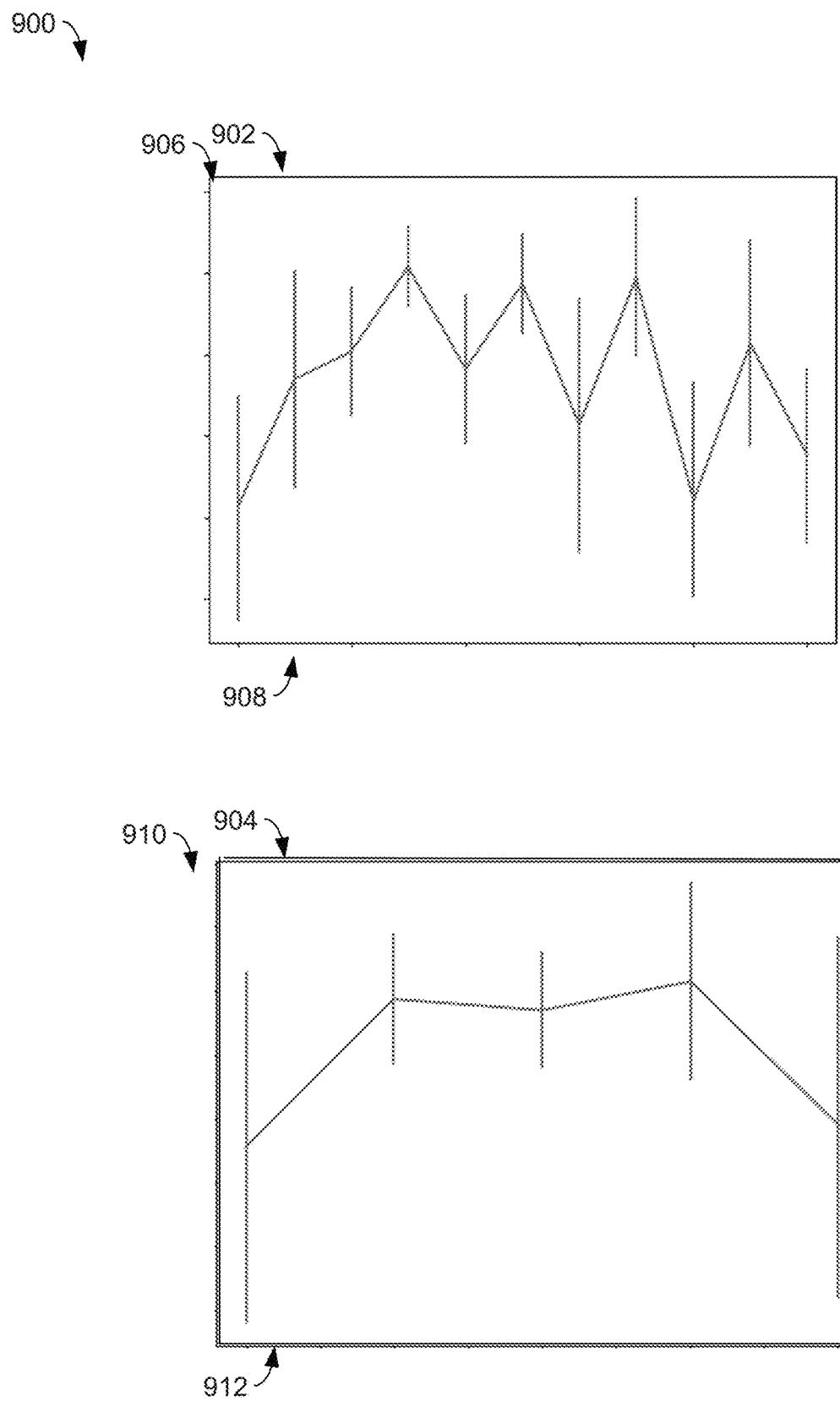
FIG. 9 illustrates example, non-limiting graphs that plots a performance of short depth circuits as quantum classifiers in a three-label example where the samples are drawn from three spread-out Gaussians, and additional layers are used relative to in FIG. 8, in accordance with one or more embodiments described.

FIG. 9 illustrates example, non-limiting graphs that plots a performance of short depth circuits as quantum classifiers in a three-label example where the samples are drawn from three spread-out Gaussians, and additional layers are used relative to FIG. 8, in accordance with one or more embodiments described. This performance can be a performance associated with a machine-learning classifier that can be implemented using computing system 100 or computing system 200. Graphs 900 depict another three-label example, relative to the three-label examples of graphs 700 and graphs 800. Here, performance can be considered where samples are drawn from spread out Gaussians, as shown in graph 902, and run the simulation with 1 training sample per label and 25 test samples, with a result shown in graph 904. Performance of the classifier can be compared, and layers in the first plot and even layers in the second plot are plotted. Graph 902 has a y-axis 906 that represents a success ratio, and an x-axis 908 that represents a number of layers. Graph 904 has a y-axis 910 that represents a success ratio, and an x-axis 912 that represents a number of layers.

Figure 10:
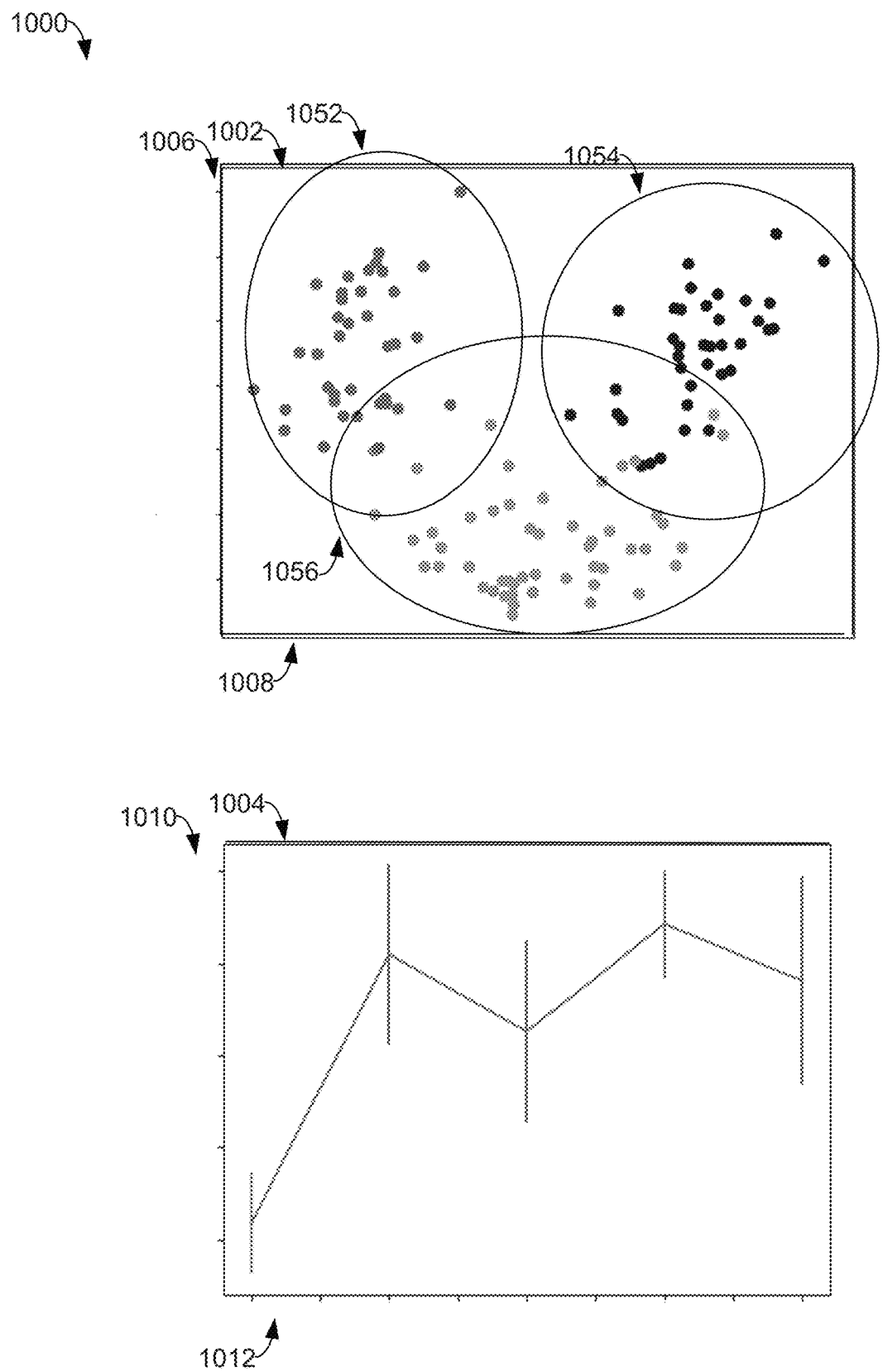
FIG. 10 illustrates example, non-limiting graphs that plot a performance of short depth circuits as quantum classifiers in a three-label example where the samples are non-Gaussian, in accordance with one or more embodiments described.

FIG. 10 illustrates example, non-limiting graphs that plots a performance of short depth circuits as quantum classifiers in a three-label example where the samples (grouped as 1052, 1054, and 1056—note that there is some overlap between these groupings of samples, and each sample belongs to one grouping) are non-Gaussian, in accordance with one or more embodiments described. This performance can be a performance associated with a machine-learning classifier that can be implemented using computing system 100 or computing system 200. Graphs 1000 depict a dataset (here, classifying a particular type of drink across two main principle axes), in graph 1002. The performance can be tested comparably to a naive Bayesian classifier on a rescaled dataset with features reduced to 2, with a result shown in graph 1004. The dataset contains about 180 samples of three kinds of drinks. An equal number of samples are drawn from each concept class in the training set, and the number of samples from each class can be restricted to 48. The dataset can originally be 13 dimensional, and the number of features can be reduced to 2 via preprocessing. 16 samples are used per label. Graph 1002 has a y-axis 1006 that represents one value for the sample data, and an x-axis 1008 that represents a second value for the sample data. Graph 1004 has a y-axis 1010 that represents a success ratio, and an x-axis 1012 that represents a number of layers.

Figure 11:
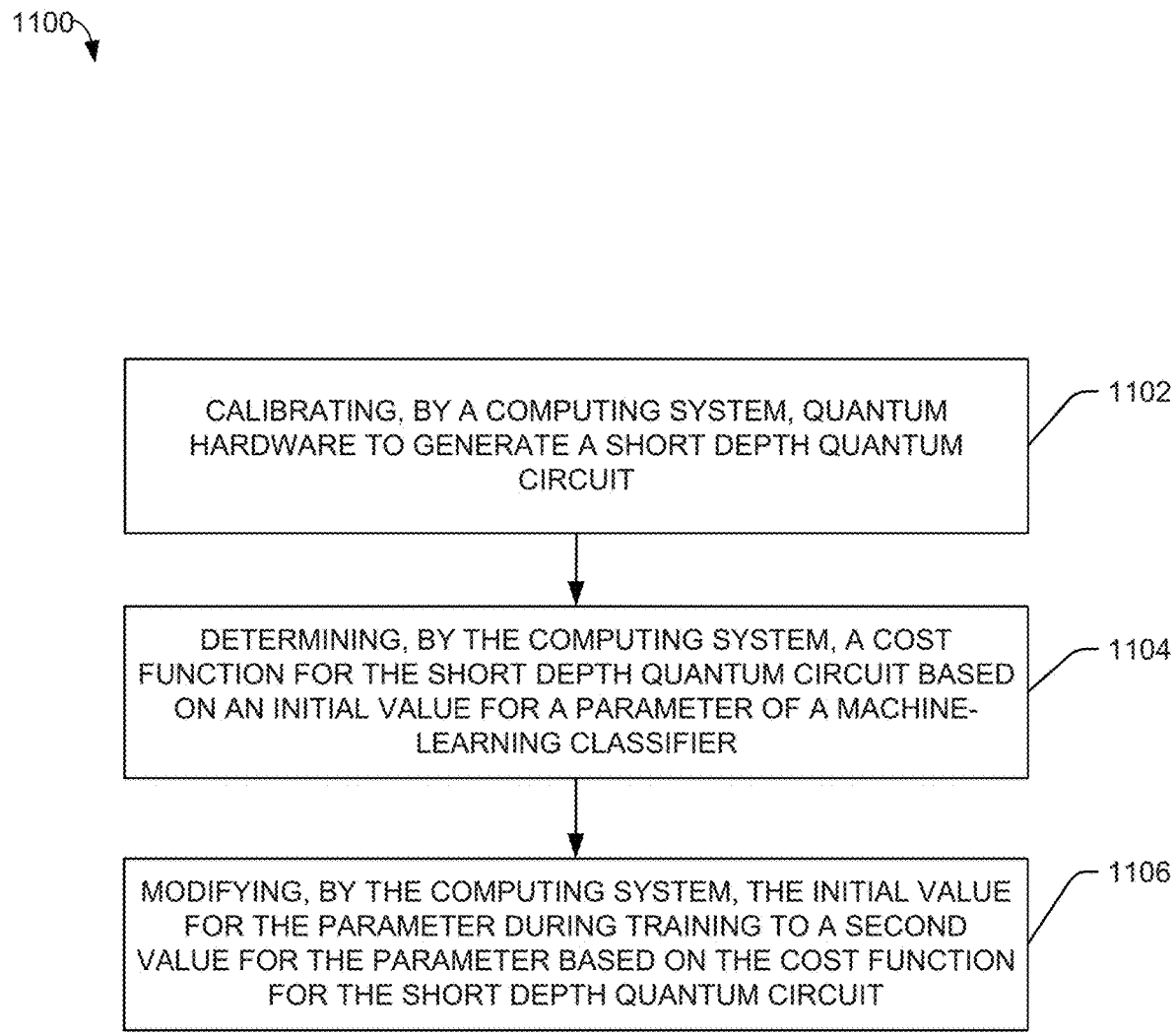
FIG. 11 illustrates a flow diagram of an example, non-limiting computer-implemented method that facilitates implementing short depth circuits as quantum classifiers, in accordance with one or more embodiments described herein.

FIG. 11 illustrates a flow diagram of an example, non-limiting computer-implemented method that facilitates implementing short depth circuits as quantum classifiers, in accordance with one or more embodiments described herein. In examples, aspects of this non-limiting computer implemented method can be implemented using computing system 100 or computing system 200. It can be appreciated that there can be examples where more or fewer operations are depicted than in flow diagram 1100, and/or that the operations depicted in flow diagram 1100 are implemented in a different order than is depicted here.

In flow diagram 1100, operation 1102 depicts calibrating, by a computing system (e.g., quantum computing system 106 or computing system 200), quantum hardware to generate a short depth quantum circuit. In some examples, the short depth quantum circuit utilizes at least one gate that can be naturally accessible on the quantum hardware. In some examples, operation 1102 includes determining a feature map that prepares a simple input state for the short depth quantum circuit based on training information. In some examples, operation 1102 includes selecting the short depth quantum circuit from a hardware-efficient circuit family. In some examples, operation 1102 includes preparing a sample to be classified as an input quantum state with a feature map.

Operation 1104 depicts determining, by the computing system (e.g., quantum computing system 106 or computing system 200), a cost function for the short depth quantum circuit based on an initial value for a parameter of a machine-learning classifier. In some examples, operation 1104 includes determining a second cost function that indicates a measurement for a quantum binary state discrimination. In some examples, operation 1104 includes determining a second cost function that identifies a high-probability multi-label classification scheme for k-ary quantum state discrimination. In some examples, operation 1104 includes determining a second cost function that identifies a Hilbert space and feature space partition for binary data classification. In some examples, operation 1104 includes determining a second cost function that identifies a Hilbert space and feature space partition for k-ary data classification.

In some examples, operation 1104 includes measuring an output statistic of the short depth quantum circuit, determining a second cost function of a plurality of cost functions based on the output statistic, and assigning the output statistic to the second cost function. In some examples, operation 1104 includes determining a total cost function based on the second cost function.

Operation 1106 depicts modifying, by the computing system (e.g., quantum computing system 106 or computing system 200), the initial value for the parameter during training to a second value for the parameter based on the cost function for the short depth quantum circuit. In some examples, operation 1106 includes encoding labeled training information into at least one qubit via a quantum feature map. In some examples, operation 1106 includes implementing a measurement scheme for binary label classification of training information.

In some examples, operation 1106 includes implementing a commuting measurement scheme facilitating multi-label classification of training information. In some examples, operation 1106 includes determining an output of an activation function of the machine-learning classifier based on the second value of the parameter. In some examples, operation 1106 includes operating the short depth quantum circuit with the second value of the parameter. In some examples, operation 1106 includes measuring an output from operating the short depth quantum circuit, and assigning a classification label for the sample to be classified based on the output from operating the short depth quantum circuit.

Figure 12:
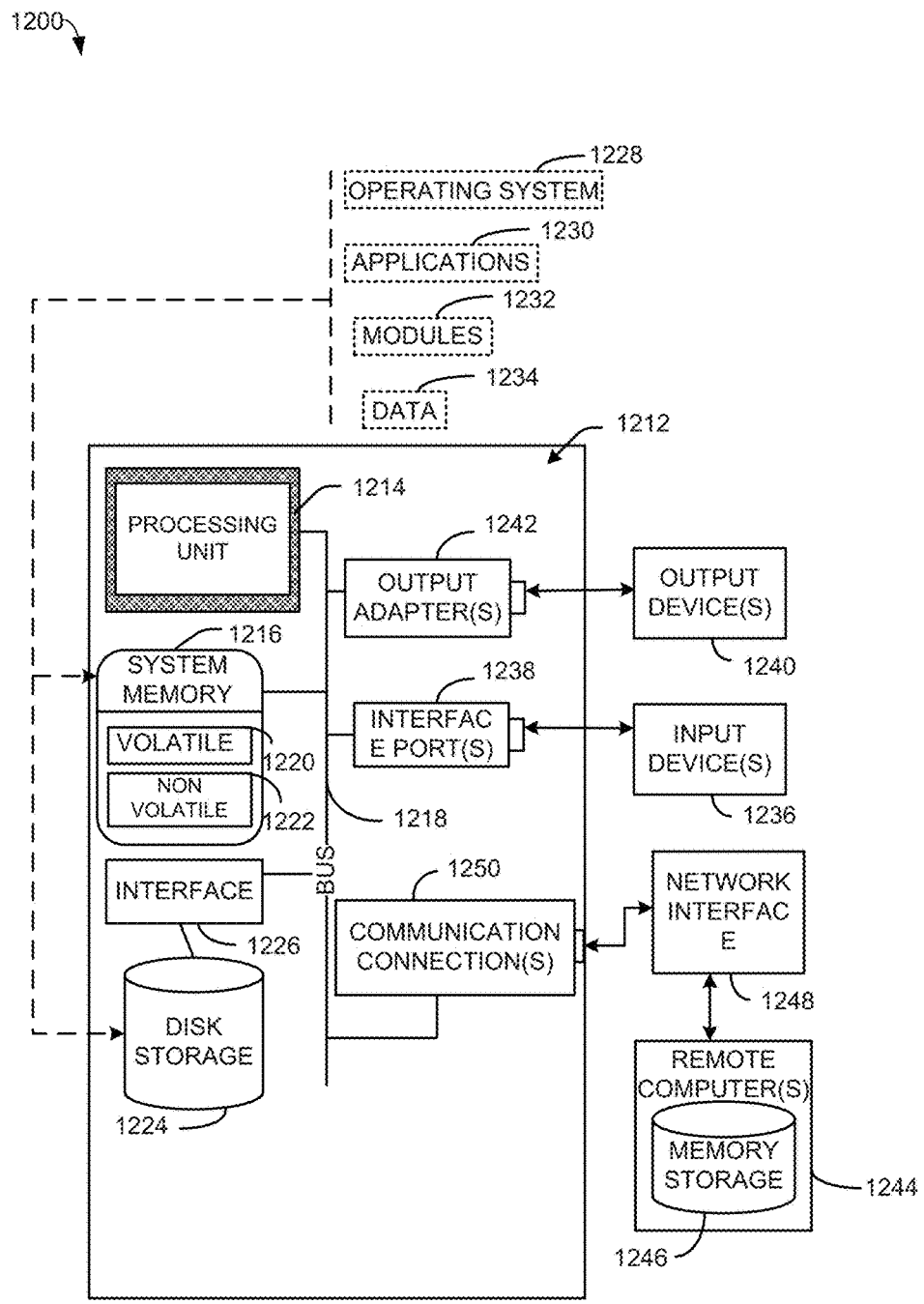
FIG. 12 illustrates a block diagram of an example non-limiting operating environment in which one or more embodiments described herein can be facilitated.

In order to provide a context for the various aspects of the disclosed subject matter, FIG. 12 as well as the following discussion are intended to provide a general description of a suitable classical computing environment in which the various aspects of the disclosed subject matter can be implemented. In some examples, this classical computing environment can be used to implement machine-learning classifier control logic 204 or machine-learning classifier readout control logic 214. FIG. 12 illustrates a block diagram of an example, non-limiting operating environment in which one or more embodiments described herein can be facilitated. Repetitive description of like elements employed in other embodiments described herein is omitted for sake of brevity.

With reference to FIG. 12, a suitable operating environment 1201 for implementing various aspects of this disclosure can also include a computer 1212. The computer 1212 can include a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214. The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 1216 can also include volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1220 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1212 can also include removable/non-removable, volatile/nonvolatile computer storage media. FIG. 12 illustrates, for example, a disk storage 1224. Disk storage 1224 can also include, but is not limited to, devices like a magnetic disk drive, floppy disk drive, tape drive, Jaz drive, Zip drive, LS-100 drive, flash memory card, or memory stick. The disk storage 1224 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1224 to the system bus 1218, a removable or non-removable interface is typically used, such as interface 1226. FIG. 12 also depicts software that acts as an intermediary between users and the basic computer resources described in the suitable operating environment 1201. Such software can also include, for example, an operating system 1228. Operating system 1228, which can be stored on disk storage 1224, acts to control and allocate resources of the computer 1212. System applications 1230 take advantage of the management of resources by operating system 1228 through program modules 1232 and program data 1234, e.g., stored either in system memory 1216 or on disk storage 1224. It is to be appreciated that this disclosure can be implemented with various operating systems or combinations of operating systems. A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port can be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a computer, a server, a router, a network PC, a workstation, a microprocessor based appliance, a peer device or other common network neuron and the like, and typically can also include many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1250 refers to the hardware/software employed to connect the network interface 1248 to the system bus 1218. While communication connection 1250 is shown for illustrative clarity inside computer 1212, it can also be external to computer 1212. The hardware/software for connection to the network interface 1248 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   quantum hardware;
   a memory that stores computer executable components; and
   a processor that executes the computer executable components stored in the memory, wherein the computer executable components comprise:
   a calibration component that calibrates the quantum hardware to generate a short depth quantum circuit;
   a cost function component that determines a cost function for the short depth quantum circuit based on an initial value for a parameter of a machine-learning classifier; and a training component that modifies the initial value for the parameter during training to a second value for the parameter based on the cost function for the short depth quantum circuit.

2. The system of claim 1, wherein the computer executable components further comprise:
a machine learning component that determines an output of an activation function of the machine-learning classifier based on the second value of the parameter.

3. The system of claim 1, wherein the training component encodes labeled training information into at least one qubit via a quantum feature map.

4. The system of claim 1, wherein the short depth quantum circuit utilizes at least one gate that is naturally accessible on the quantum hardware.

5. The system of claim 1, wherein the training component utilizes a fixed-frequency superconducting qubit architecture to generate an architecture of the machine-learning classifier.

6. The system of claim 1, wherein the training component implements a measurement scheme for binary label classification of training information.

7. The system of claim 1, wherein the training component implements a commuting measurement scheme facilitating multi-label classification of training information.

8. A computer-implemented method, comprising:
calibrating, by a computing system, quantum hardware to generate a short depth quantum circuit;
determining, by the system, a first cost function for the short depth quantum circuit based on an initial value for a parameter of a machine-learning classifier; and
modifying, by the system, the initial value for the parameter during training to a second value for the parameter based on the first cost function for the short depth quantum circuit.

9. The computer-implemented method of claim 8, further comprising:
determining, by the system, a second cost function that indicates a measurement for a quantum binary state discrimination.

10. The computer-implemented method of claim 8, further comprising:
determining, by the system, a second cost function that identifies a high-probability multi-label classification scheme for k-ary quantum state discrimination.

11. The computer-implemented method of claim 8, further comprising:
determining, by the system, a second cost function that identifies a Hilbert space and feature space partition for binary data classification.

12. The computer-implemented method of claim 8, further comprising:
determining, by the system, a second cost function that identifies a Hilbert space and feature space partition for k-ary data classification.

13. The computer-implemented method of claim 8, further comprising:
determining, by the system, a feature map that prepares a simple input state for the short depth quantum circuit based on training information.

14. The computer-implemented method of claim 8, further comprising:
selecting, by the system, the short depth quantum circuit from a hardware-efficient circuit family.

15. A computer program product, the computer program product comprising a computer readable storage medium having program instructions embodied therewith, the program instructions executable by a computing system to cause the computing system to at least:
calibrate quantum hardware to generate a short depth quantum circuit;
determine a cost function for the short depth quantum circuit based on an initial value for a parameter of a machine-learning classifier; and
modify the initial value for the parameter during training to a second value for the parameter based on the cost function for the short depth quantum circuit.

16. The computer program product of claim 15, wherein the program instructions are further executable by the computing system to cause the computing system to at least:
measure an output statistic of the short depth quantum circuit;
determine a second cost function of a plurality of cost functions based on the output statistic; and
assign the output statistic to the second cost function.

17. The computer program product of claim 16, wherein the program instructions are further executable by the computing system to cause the computing system to at least:
determine a total cost function based on the second cost function.

18. The computer program product of claim 15, wherein the program instructions are further executable by the computing system to cause the computing system to at least:
prepare a sample to be classified as an input quantum state with a feature map.

19. The computer program product of claim 18, wherein the program instructions are further executable by the computing system to cause the computing system to at least:
operate the short depth quantum circuit with the second value of the parameter.

20. The computer program product of claim 19, wherein the program instructions are further executable by the computing system to cause the computing system to at least:
measure an output from operating the short depth quantum circuit; and
assigning a classification label for the sample to be classified based on the output from operating the short depth quantum circuit.

* * * * *